United States Patent [19]

Nakagome et al.

[11] 4,456,988
[45] Jun. 26, 1984

[54] SATELLITE REPEATER

[75] Inventors: Yukio Nakagome, Yokohama; Akira Ogawa, Machida; Yasuo Hirata, Mitaka; Toshio Takahashi, Tokyo, all of Japan

[73] Assignee: Kokusai Denshin Denwa Kabushiki Kaisha, Tokyo, Japan

[21] Appl. No.: 343,181

[22] Filed: Jan. 27, 1982

[30] Foreign Application Priority Data

Jan. 29, 1981 [JP] Japan .................................. 56-10886
Jan. 29, 1981 [JP] Japan .................................. 56-10887

[51] Int. Cl.³ ........................ H04B 7/185; H04J 1/02
[52] U.S. Cl. ..................................... 370/75; 370/108; 455/12; 455/18
[58] Field of Search ................. 370/100, 104, 108, 75; 375/3, 4, 107, 118; 455/12, 13, 18

[56] References Cited

U.S. PATENT DOCUMENTS

4,004,098  1/1977  Shimasaki ........................... 455/13
4,215,348  7/1980  Cordaro et al. ...................... 370/104

Primary Examiner—Benedict V. Safourek
Attorney, Agent, or Firm—Robert E. Burns; Emmanuel J. Lobato; Bruce L. Adams

[57] ABSTRACT

A satellite repeater for a digital satellite communication system for use on board of satellites. Receivers are provided with respective antennas for receiving radio-frequency signals from a plurality of ground stations. A signal processing circuit switches signals received in synchronism with stable clock timings. Transmitters receive the switched outputs of the signal processing circuit to provide radio-frequency signals for transmission through respective antennas of the transmitters. Timing detectors receive the outputs of the receivers and detect the frame timings of the output signals of the receivers. Signal storage circuits are provided between respective outputs of the receivers and the signal processing circuit for storing the respective output signals of the receivers by respective amounts. Control circuitry connected to the timing detectors, the signal storage circuits and the signal processing circuit control the storage operations of the signal storage circuits so that each of the frame timings of the received signals and the switching timing of the signal processing circuit have a desired timing relationship.

5 Claims, 9 Drawing Figures

SATELLITE REPEATER

BACKGROUND OF THE INVENTION

The present invention relates to a satellite repeater for satellite communications, and more particularly to a satellite repeater which is suitable for use in a digital satellite communication system utilizing time division multiple access (TDMA) or frequency division multiple access (FDMA) techniques.

The most common traditional system for satellite communications is an FDM-FM-FDMA system. In order to answer the increasing number of earth stations in the system and of traffic, however, the introduction of digital satellite communication systems has been studied which are of higher efficiency and larger capacity and capable of flexibly following up traffic variations. As a result, there has already been put to practical use a system, called Satellite Switched TDMA (SS/TDMA), in which a multi-spot beam satellite and the TDMA techniques are combined, a dynamic switch is provided on the satellite and the beams are switched at a high speed in synchronism with TDMA frames. In the conventional system, it is necessary for each earth station to control the transmit timing of its signal to synchronize it with the switching timing of the dynamic switch matrix on board the satellite; to perform this, the earth station calls for an initial synchronizer and equipment for maintaining the synchronization of the timings.

BRIEF SUMMARY OF THE INVENTION

In view of the prior art, it is an object of the present invention to provide a satellite repeater equipped with a simple synchronization function.

In accordance with this invention, there is provided a satellite repeater for digital satellite communication which is provided with at least receiving antennas, receivers, a signal processing circuit for switching signals sent from a plurality of earth stations or for combining or converting the signals, transmitters, and transmitting antennas, characterized by the provision of a receiving timing detector for detecting the frame timing of each of the signals; a signal storage circuit provided between one of the receivers and the signal processing circuit for storing the signal by a desired amount; a timing generator for generating timing for the signal processing; and control means for controlling the storage operation of the signal storage circuit so that the frame timing and the timing for the signal processing bear a desired relationship.

BRIEF DESCRIPTION OF THE DRAWINGS

The present invention will hereinafter be described in detail with reference to the accompanying drawings, in which.

DETAILED DESCRIPTION

Figure 1:
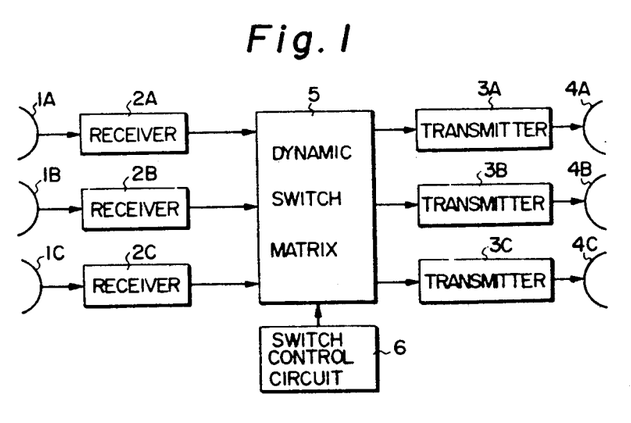
FIG. 1 is a block diagram explanatory of the time division communication system to which the present invention is applied.
Figure 2:
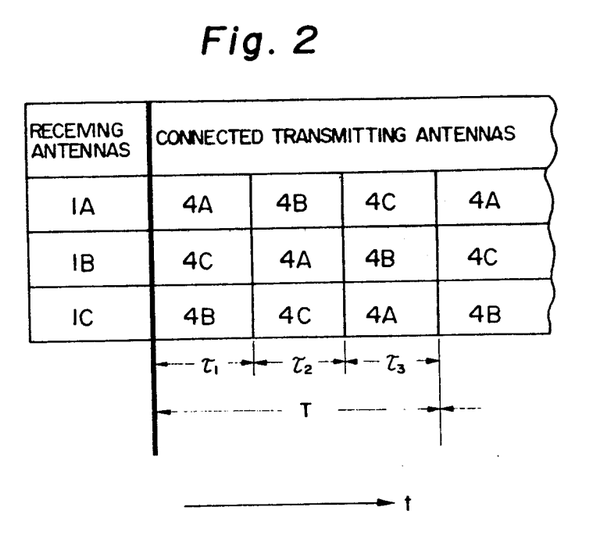
FIG. 2 is a timing chart explanatory of the operation of the time division communication system shown in FIG. 1.

With reference to FIG. 1, a typical example of the arrangement of a satellite repeater employed in the abovesaid SS/TDMA system will first be described for ready understanding of the present invention. In FIG. 1, reference numerals 1A, 1B and 1C indicate receiving antennas; 2A, 2B and 2C designate receivers respectively corresponding to the receiving antennas 1A, 1B and 1C; 3A, 3B and 3C identify transmitters; 4A, 4B and 4C denote transmitting antennas respectively corresponding to the transmitters 3A, 3B and 3C; 5 represents a dynamic switch matrix for switching the connection between the receivers 2A, 2B and 2C and the transmitters 3A, 3B and 3C; and 6 shows a switch control circuit for controlling the switching operation of the dynamic switch matrix 5. FIG. 2 is a diagram explanatory of an example of the switching operation of the dynamic switch matrix, the abscissa representing time t.

Generally, in the SS/TDMA system, the time interval corresponding to the TDMA frame length, on the satellite, is divided into, for example, a plurality of periods $\tau_1$, $\tau_2$ and $\tau_3$ as shown in FIG. 2. In the period $\tau_1$, an input signal from the receiving antenna 1A is connected to the transmitting antenna 4A and input signals from the receiving antennas 1B and 1C are connected to the transmitting antennas 4C and 4B, respectively; in the period $\tau_2$, the input signals from the receiving antennas 1A, 1B and 1C are connected to transmitting antennas 4B, 4A and 4C, respectively; in the period $\tau_3$, input signals from the receiving antennas 1A, 1B and 1C are connected to the transmitting antennas 4C, 4B and 4A, respectively. Accordingly, in a case of an earth station located in a beam coverage area of the receiving antenna 1A, information for an earth station in the beam coverage area of the transmitting antenna 4A, information for an earth station in the beam coverage area of the transmitting antenna 4B and information for an earth station in the beam coverage area of transmitting antenna 4C are transmitted in the periods $\tau_1$, $\tau_2$ and $\tau_3$, respectively, by which it is possible to set up communication link between the earth station in one beam coverage area and the earth stations in the beam coverage areas of the respective transmitting antennas. This switching operation is performed by the dynamic switch matrix 5 under the control of the switch control circuit 6. What is important here is that the TDMA frame timing and the switching timing of the dynamic switch matrix 5 must completely be synchronized with each other. For this synchronization, use is made of either one of the following two methods. (1) Since a signal transmitted from each earth station is looped back thereto at least once for each frame at the same timing, the earth station detects this timing, thereby to achieve the synchronization independently, and (2) after a reference station has established the synchronization by the method (1), all the other earth stations establish synchronism by slaving their bursts to a reference burst transmitted from the reference station.

Figure 3:
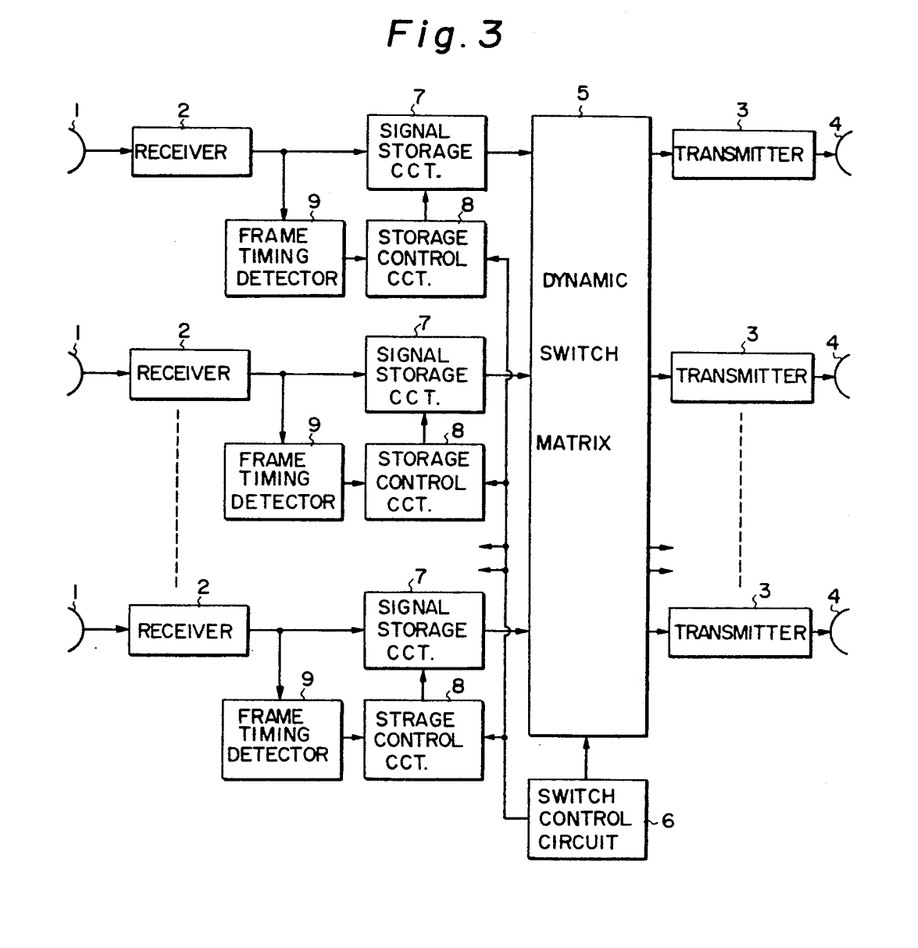
FIGS. 3, 4, 5 and 6 are block diagrams illustrating embodiments of the present invention.

FIG. 3 illustrates a first embodiment of the satellite repeater of the present invention. In FIG. 3, reference numeral 1 indicates receiving antennas; 2 designates receivers; 3 identifies transmitters; 4 denotes transmitting antennas; 5 represents a dynamic switch matrix; and 6 denotes a switch control circuit. These components are identical in function with those described previously in respect of FIG. 1. Components identified by 7, 8 and 9 are provided according to the present invention. Reference numeral 7 indicates a signal storage circuit; 8 designates a storage control circuit; and 9 identifies a frame timing detector. A TDMA signal transmitted from each earth station is received by the receiver 2 via the receiving antenna 1 and then led to the signal storage circuit 7. At the same time, the received signal is fed to the frame timing detector 9, wherein the frame start timing of the TDMA signal is detected. In this case, a unique word positioned, for example, at the head of the TDMA frame is identified to detect the leading position of the frame (the frame start timing). In the storage control circuit 8, the frame start timing signal thus obtained is compared in timing with a switching timing signal produced by the switch control circuit 6, that is, a timing signal for signal processing performance in the dynamic switch matrix 5; and the storage or storage time of the signal storage circuit 7 is controlled so that the above-mentioned two timing signals coincide with each other at the input of the dynamic switch matrix 5.

The signal storage circuit 7 can be formed by an elastic surface wave delay element or the like. The present invention is also applicable to a satellite repeater of such an arrangement that the receiver 2 and the transmitter 3 have a frequency conversion function to switch their beams at the intermediate frequency.

Figure 4:
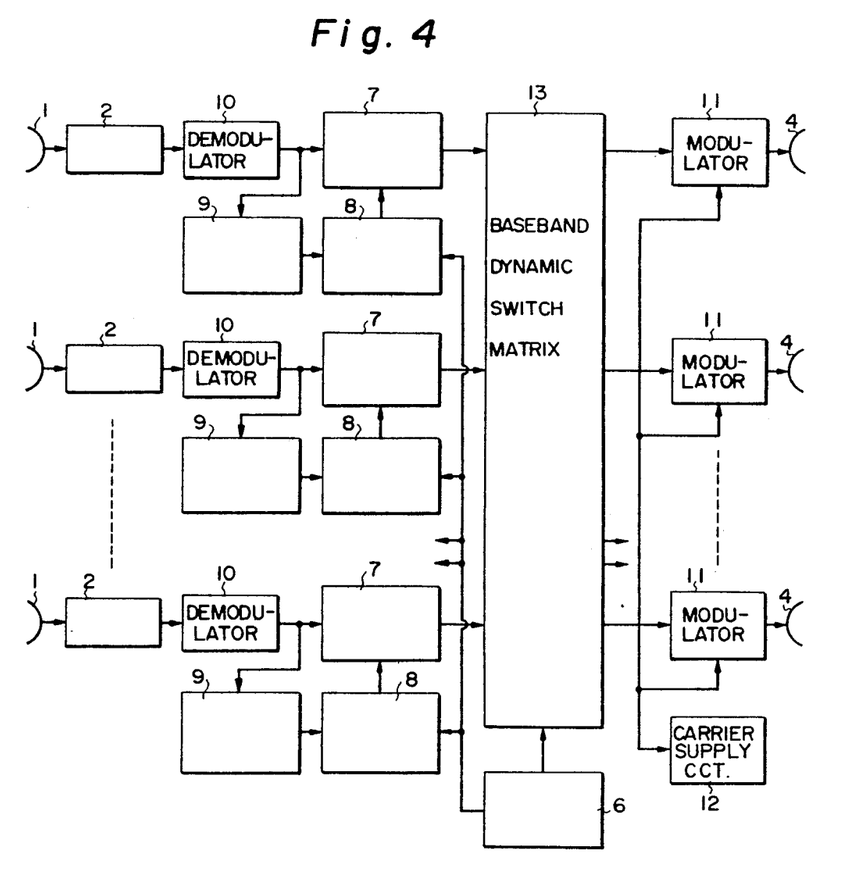

Further, the present invention is also applicable to a satellite repeater having a regenerative repeating function. An example of the arrangement employed in this case is shown as a second embodiment of the present invention in FIG. 4. In FIG. 4, reference numeral 10 indicates demodulators, each demodulating the received signal into a baseband signal; 11 designates modulators, each modulating the baseband signal into a radio-frequency signal of a predetermined power; 12 identifies a carrier supply circuit; and 13 denotes a baseband switch matrix which performs a switching operation theoretically identical with the dynamic switch matrix 5 employed in the embodiment of FIG. 3. The other reference numerals identify the same components as used in the embodiment of FIG. 2. In this embodiment, the signal storage circuit 7 is constituted by a delay element such as a CCD, or a digital IC memory, and for the detection of the unique word by a receiving timing detector 9, use can be made of a conventional correlation method or like conventional techniques. The operation of this embodiment is identical in principles with the operation of the embodiment of FIG. 3; therefore, no detailed description will be repeated.

Figure 5:
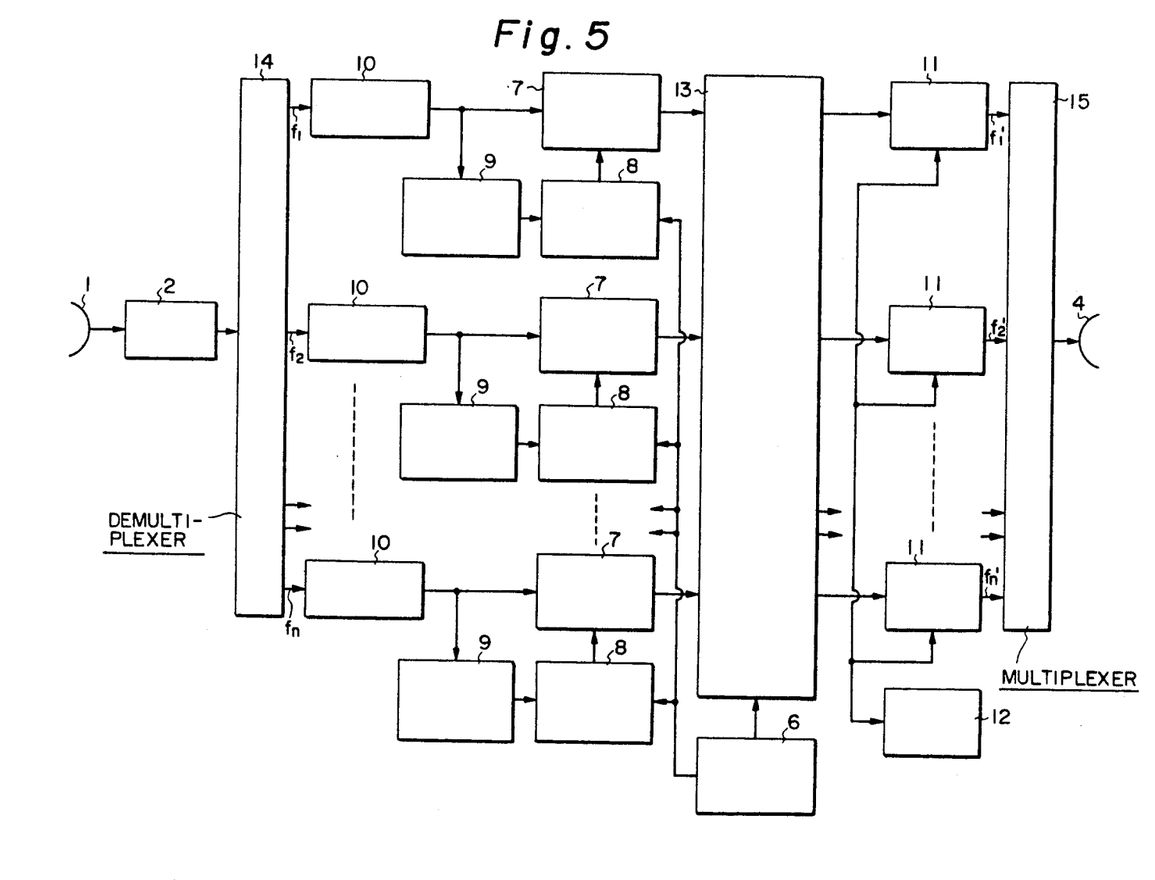

FIG. 5 illustrates a third embodiment of the present invention, showing an example of the satellite repeater arrangement in a case where the present invention is applied to the frequency division multiple access (FDMA) system. To earth stations are individually assigned separate frequencies for signal transmission but, in the conventional FDMA system, multiple signals are time-multiplexed at the earth station in order to reduce the number of carriers to be transmitted. Accordingly, it is necessary for each earth station to receive carriers corresponding to the same number of destinations.

This embodiment is intended to simplify the receiving equipment of the earth station by rearranging the multiplexed signal on the satellite to decrease the number of carriers to be received by the earth station. In FIG. 5, reference numeral 14 indicates a demultiplexer; and 15 designates multiplexer. The other reference numerals identify the same components as those utilized in the first and second embodiments. FDMA signals of carriers $f_1$ to $f_n$ which are transmitted from respective earth stations are amplified by the receiver 2 and applied to the demultiplexer 14, wherein they are branched by band-pass filters according to the carriers $f_1$ to $f_n$, and each output is applied to the demodulator 10. Each baseband signal thus demodulated is led to the baseband switch matrix 13, wherein the baseband arrangement is reorganized so that information to the same earth station may become a signal of the same baseband. Thereafter, the respective outputs of individual switch matrix 13 are modulated by the modulators 11 to produce signals of predetermined frequencies $f_1'$ to $f_n'$ and then multiplexed on the frequency basis by the multiplexer 15, thereafter being transmitted via the single transmitting antenna 5 to earth stations. Accordingly, it is sufficient for each earth station to receive that one of the carriers $f_1'$ to $f_n'$ which has the information directed to the earth station.

For such reorganization of the multiplexed signal, it is required that the respective baseband signals be coincident in frame timing with one another at the input of the baseband switch matrix 13. This can be achieved by the signal storage circuit 7, the receiving timing detector 9 and the storage control circuit 8 in accordance with the present invention.

Figure 6:
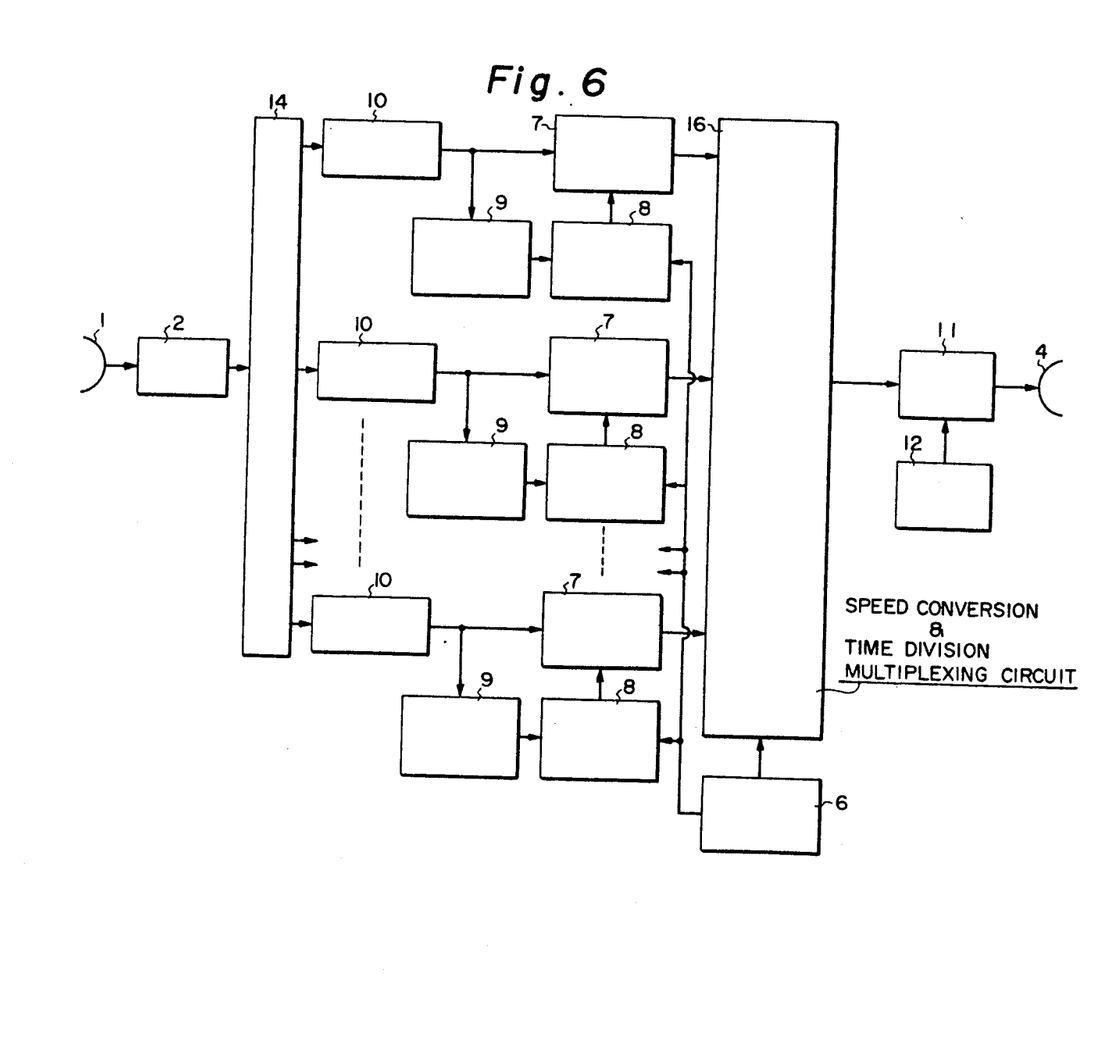

FIG. 6 illustrates a fourth embodiment of the present invention as being applied to a satellite repeater which is designed to perform not only the time multiplexing operation but also the conversion of the signal transmission rate.

The TDMA system possesses the advantages of (1) reduced numbers of signals to be transmitted and received and (2) flexibility in operation which permits a change of the circuit used, but it has such a disadvantage that each earth station requires a high power transmitter because of so high signal transmission rate. On the other hand, an SCPC (Single Channel Per Carrier) system in which different carriers are assigned to individual channels has an advantage of small transmitting power although it is deflective in that the number of signals to be transmitted is large. Accordingly, it is general practice to employ the TDMA system for a large-capacity communication circuit and the SCPC system for a small-capacity communication circuit and in one satellite communication system, both are used in combination.

In accordance with this embodiment, an equipment similar to the aforesaid switch matrix is loaded on a satellite, by which continuous signals transmitted from a plurality of earth stations are subjected to speed conversion and are timemultiplexed, whereby a plurality of low-speed signals are converted into a serial high-speed signal which is re-transmitted to the earth. This permits economization of the earth station equipment.

In FIG. 6, reference numeral 16 indicates a speed conversion and time division multiplexing circuit. A plurality of signals, which are received and demodulated in the same manner as in the case of FIG. 5, are converted by the speed conversion and time division multiplexing circuit 16 into a serial high-speed signal, which is sent out via the transmitting antenna 4 to each earth station after being modulated. In this case, it is also necessary that the frame phases of the respective baseband signals be synchronized with one another at the input of the speed conversion and time division multiplexing circuit 16. The frame synchronization can be established by the principal part of the present invention which comprises the signal storage circuit 7, the storage control circuit 8 and the receiving timing detector 9. In the arrangement of this embodiment, the speed conversion and time division multiplexing circuit 16, the signal storage circuit 7, the storage control circuit 8 and the receiving timing detector 9 can be formed as unitary structure with one another.

The foregoing has described some embodiments of the present invention; the following will describe the signal storage of the signal storage circuit 7 and its control which are common to all the embodiments described in the foregoing.

It is considered that noncoincidence between the frame timing of the digital signal transmitted from each earth station and the switching timing of the switch matrix on the satellite occurs from such sources as follows:

(1) A fixed phase noncoincidence between the frame timing of the digital signal and the switching timing of the switch matrix which is caused by the fact that the earth station does not control the frame start timing of the digital signal;

(2) Periodic timing variations which accompany changes in the position of the satellite relative to the earth (which depend on the satellite station keeping technique for maintaining the satellite at its stationary position); and (3) A slip of timing between a reference oscillator of the earth station for generating the digital signal and a reference oscillator of the satellite for generating the switch matrix switching timing because of independent operation of the both reference oscillators.

Letting the switching period of the switch matrix, the frame length of the digital signal and the maximum value of the periodic timing variations by the cause (2) be represented by $T_s$, $T_f$ and $T_d$ sec, respectively, and assuming that $T_s$ and $T_f$ are equal, the signal storage necessary for the signal storage circuit 7 in view of the abovesaid causes is the amount of information corresponding to $(T_f+T_d)$ sec. For example, in a case where $T_s=T_f=2$ milliseconds, $T_d=0.5$ milliseconds and the transmission rate of the digital signal is 60 megabits/sec, the signal storage expressed in terms of bits is $(2+0.5)\times 10^{-3}\times 60\times 10^6 = 150\times 10^3$ bits.

The slip between the frame timing of the digital signal and the switching timing of the switch matrix, which arises from the use of independent reference oscillators as mentioned above in (3), is controlled to match the both timing with each other by deleting or repeating the digital signal in units of frames at the time when the interrelation between the phase of the frame of the digital signal and the phase of the switching timing of the switch matrix exceeds a preset threshold value.

As has been described in the foregoing, by adding a simple circuit to the satellite repeater in accordance with the present invention, a difference in the frame timing between signals transmitted from earth stations can be compensated for on the satellite and the equipment of each earth station can substantially be simplified. Accordingly, the present invention is of wide application, and hence is of great industrial value.

An application of the present invention to a synchronization system for inter-satellite link will hereinafter described.

Any of the above conventional systems are TDMA systems employing a single communications satellite. For the connection to an earth station located outside the service area of one communications satellite, however, it has recently been proposed to provide an inter-satellite link utilizing the TDMA techniques between the communications satellite and another communications satellite connectable to such an earth station. In this case, new problems arises concerning the synthronization of TDMA frames between the inter-satellite link and earth station-satellite link. The problems are (1) periodic variations in the path length of the intersatellite link owing to the drift of each satellite, (2) out of synchronization of TDMA frames due to operations of the satellites on independent clocks on their own, and (3) non-coincidence of TDMA frame timing between the two systems because of an unknown value of the inter-satellite distance. No satisfactory solutions to these technical problems have been proposed yet.

In view of the abovesaid technical problems, the present invention is also applicable to a synchronization system for an inter-satellite link which permits synchronization between the inter-satellite link and an earth to satellite link by the additional provision of a simple equipment on a satellite repeater.

Figure 7:
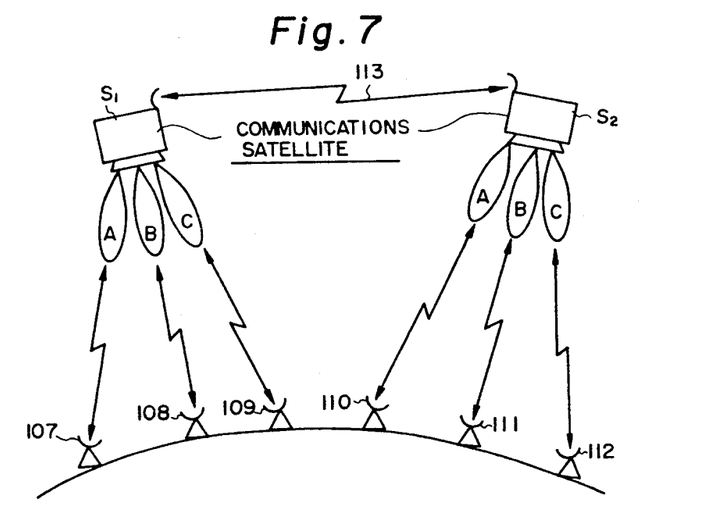
FIG. 7 is a diagram showing the concept of a satellite communication system to which the present invention is applied.

FIG. 7 is a schematic diagram illustrating the concept of the satellite communication system with an inter-satellite link to which the present invention is applied. In FIG. 7, reference character $S_1$ and $S_2$ indicate communications satellites, each having three spot beams A, B and C; 107 to 112 designate earth stations; and 113 identifies an inter-satellite link for interconnecting the communications satellites $S_1$ and $S_2$. This is a system in which the communications satellites $S_1$ and $S_2$ are operated on independent clocks by the SS/TDMA system described previously in connection with FIGS. 1 and 2 and the inter-satellite link 113 using the TMDA techniques is added for interconnecting the communications satellites $S_1$ and $S_2$.

This communication system also encounters such problems as referred to previously: (1) periodic variations in the path length of the inter-satellite link 113 due to the drift of the communications satellites $S_1$ and $S_2$, (2) out of synchronization of TDMA frames due to operations of the communications satellites $S_1$ and $S_2$ on independent clocks of their own and (3) non-coincidence of the TDMA frame timing between the both SS/TDMA systems because of an unknown value of the distance between the communications satellite $S_1$ and $S_2$. Their time interrelations are such as shown in FIG. 8.

Figure 8:
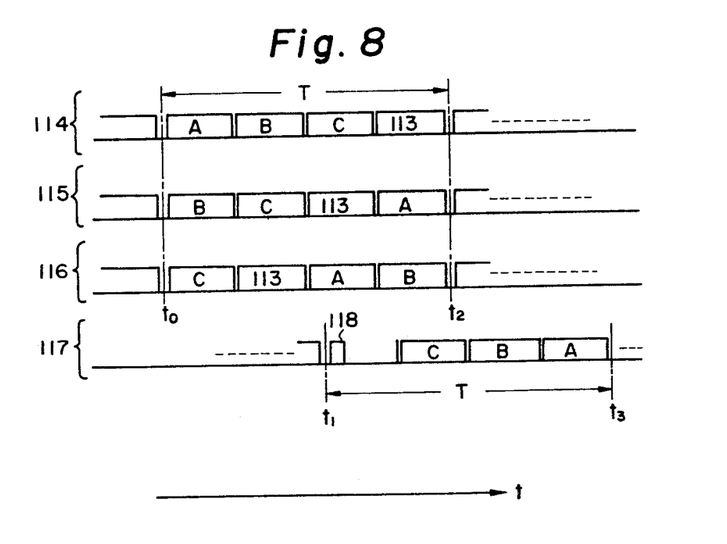
FIG. 8 is a timing chart explanatory of the operation of the satellite communication system shown in FIG. 7.

FIG. 8 shows the time charts of respective TDMA frames at receiving points on the communications satellite $S_1$. In FIG. 8, reference numeral 114 is a TDMA signal from the beam A; 115 is a TDMA signal from the beam B; 116 is a TDMA signal from the beam C; 117 is a TDMA signal from the inter-satellite link 113; T is the TDMA frame length; and 118 is a reference burst of the TDMA signal 117. Reference characters $t_0$ and $t_2$ are TDMA frame start timings of the TDMA signals 114, 115 and 116 are also the switching timings of the dynamic switch matrix 5 and TDMA signals 114, 115 and 116 are completely synchronized with each other. On the other hand, $t_1$ and $t_3$ are TDMA frame start timings of the inter-satellite link and they are not synchronized with the switching timings $t_0$ and $t_2$ of the dynamic switch matrix 5. This is for the aforementioned reasons (1) to (3) and its influence appears as a time difference between $t_0$ and $t_1$ (which may also be expressed as a time difference between $t_1$ and $t_2$) and this time difference instantaneously changes.

The present invention has its feature in compensating for the abovesaid time difference to thereby achieve synchronization between the TDMA frame timing of each beam and the inter-satellite link and the switching timing of the dynamic switch matrix 5.

Figure 9:
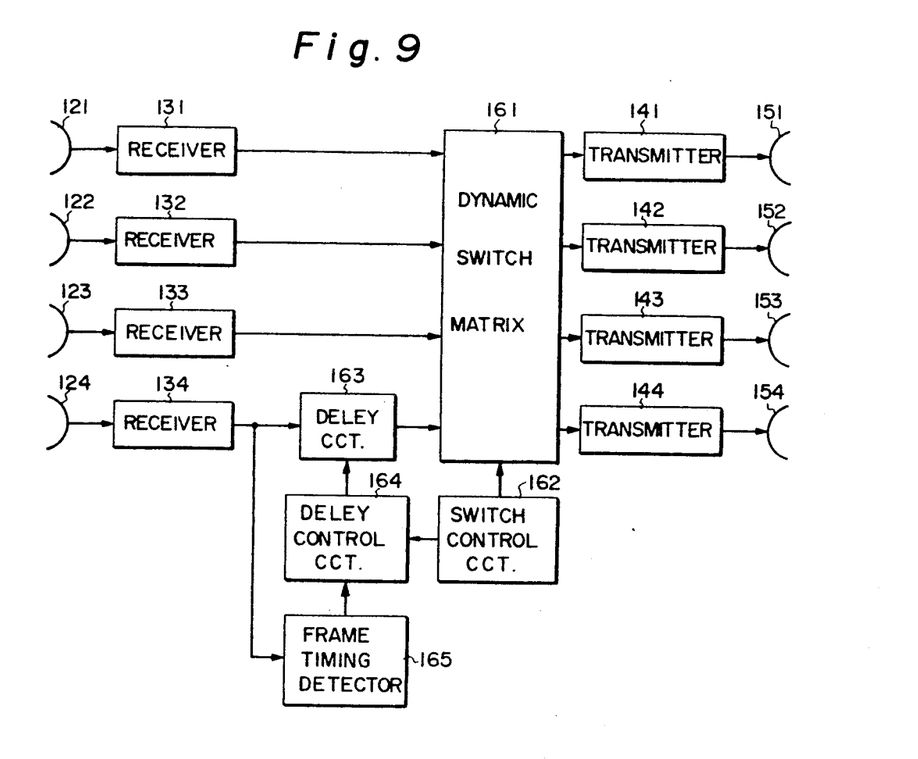
FIG. 9 is a block diagram illustrating another embodiment of the present invention.

FIG. 9 illustrates, by way of example, a satellite repeater embodying the present invention. In FIG. 9, reference numerals 121 to 123 indicate ground beam receiving antennas; 124 designates a receiving antenna for an inter-satellite link; 131 to 134 identify receivers; 141 to 144 denote transmitters; 151 to 153 represent ground beam transmitting antennas; 154 shows a transmitting antenna for the inter-satellite link; 161 refers to a dynamic switch matrix; and 162 indicates a switch control circuit. These components are basically identical with those described previously in respect to FIG. 1. Reference numerals 163 to 165 show components provided according to the present invention: 163 is a delay circuit which is formed by a surface elastic wave delay line in a case of a signal to be delayed is a microwave or intermediate-frequency wave and CCD (Charge Coupled Device) in a case of a demodulated signal; 164 is a delay control circuit; and 165 is a frame timing detector using the delay detecting techniques.

The operation of this embodiment will hereinafter be described in detail through the aid of FIGS. 8 and 9.

A TDMA signal from another satellite is received by the receiving antenna 124 for the inter-satellite link and the receiver 134 and then fed to the delay circuit 163. At the same time, the received signal is led to the frame timing detector 165; wherein the TDMA frame start timing $t_1$ is detected by detecting, for example, a unique word contained in the reference burst 118 positioned at the beginning of the TDMA frame. The TDMA frame start timing $t_1$ thus detected is applied to the delay control circuit 164, wherein it is compared with the switching timing $t_0$ or $t_2$ which is created by the switch control circuit 162 serving as a reference timing generator for generating the reference timing of the satellite. Further, the delay of the delay circuit 163 is controlled by the delay control circuit 165 so that the TDMA frame start timing $t_1$ coincide with the switching timing $t_2$ at the output of the delay circuit 163, that is, at the input of the dynamic switch matrix 161.

Now, a description will be given on the total amount of delay required in the delay circuit 163 and a method of controlling it.

Since the variations in the path length due to drift of the satellite is periodic, it is sufficient to provide the delay corresponding to the periodic variation. This depends on the satellite station keeping technique. In addition, as the non-coincidence in the frame timing which is related to the absolute value of the inter-satellite distance appears in the form of a substantially constant phase difference, the delay to be provided therefore may be the maximum TDMA frame length T. Accordingly, by preparing the sum of the TDMA frame length T and the path length variation as the delay and by properly controlling it, the aforementioned problems (1) and (3) can completely be settled. Moreover, a difference in reference clock between the satellites (a frequency difference) causes the time difference between the TDMA frame timing of the inter-satellite link and the switching timing to increase in either plus or minus direction with the lapse of time. Accordingly, in the event that the difference between the detected TDMA frame timing and the switching timing exceeds the delay of the delay circuit 163, the delay control circuit 164 is caused to perform, for example, a slip operation for deleting or repeating information in units of frames, thereby maintaining the synchronism. For the slip operation in units of frames, the delay is prepared in units of slip lengths corresponding to one TDMA frame length T or its multiples. For instance, in a case where one TDMA frame length is 125 $\mu s$ and the delay of this value is prepared, if the frequency difference between the reference clocks is $10^{-11}$. A frame slip occurs once in 72 days and this does not pose any serious problems in terms of the signal quality.

As has been described in the foregoing, according to the present invention, the relative deviation in the TDMA frame timing which presents a serious problem in the SS/TDMA system involving the inter-satellite link can be compensated for by adding a simple circuit arrangement to the satellite repeater; therefore, the present invention is of great utility.

While in the foregoing the present invention has been described in connection with the examples which use three ground beams and one inter-satellite link as in FIGS. 7, 8 and 9, this is a design choice matter. Especially in respect of FIG. 7, it is described that only one earth station access one beam, but it is also possible, of course, that a plurality of earth stations access one beam; this is the ordinary TDMA techniques. Moreover, althrough the present invention has been described with regard to the case where the communication link is provided between two communications satellites, it is self-evident that even if communication links are provided in the form of a star or mesh between adjacent ones of satellites, the present invention is applicable for each communication link between two communications satellites.

What we claim is:

1. A satellite repeater for a digital satellite communication system for use on board of a satellite comprising:
   receiving antennas for receiving radio-frequency signals sent from a plurality of ground stations in said digital satellite communication system;
   receivers connected respectively to corresponding receiving antennas;
   a signal processing circuit for switching signals received by said receivers in synchronism with stable clock timings;
   transmitters receptive of switched outputs of the signal processing circuit to provide transmitting radio-frequency signals;
   transmitting antennas connected respectively to the transmitters to transmit the transmitting radio-frequency signals;
   receiving timing detectors respectively connected to receive the outputs of the receivers for detecting the frame timings of the output signals of the receivers;
   signal storage circuits provided between respective outputs of the receivers and the signal processing circuit for storing respectively the output signal of the receivers by respective desired amounts; and
   control means operatively connected to the receiving timing detectors, the signal storage circuits and the signal processing circuit for controlling the storage operations of the signal storage circuits so that each of the frame timings of the received signals and the switching timing of the signal processing circuit bear a desired timing relationship.

2. A satellite repeater for a digital satellite communication system for use on board of a satellite comprising:
receiving antennas for receiving radio-frequency signals sent from a plurality of ground stations in said digital satellite communication system;
receivers connected respectively to the receiving antennas;
demodulators connected respectively to the receivers to provide demodulated baseband outputs;
a baseband signal processing circuit for switching the demodulated baseband outputs in synchronism with stable clock timings;
transmitters receptive of switched outputs of the baseband signal processing circuit to provide transmitting radio-frequency signals;
transmitting antennas connected respectively to the transmitters to transmit the transmitting radio-frequency signals;
receiving timing detectors respectively connected to receive the outputs of the demodulators for detecting the frame timings of the baseband outputs of the demodulators;
signal storage circuits provided between respective outputs of the demodulators and the baseband signal processing circuit for storing respectively the baseband outputs of the demodulators by respective desired amounts; and
control means operatively connected to the receiving timing detectors, the signal storage circuits and the baseband signal processing circuit for controlling the storage operations of the signal storage circuits so that each of the frame timings of the demodulated baseband output and the switching timing of the baseband signal processing circuit bear a desired timing relationship.

3. A satellite repeater for a digital satellite communication system for use onboard of a satellite comprising:
a receiving antenna for receiving radio-frequency signals sent from a plurality of ground stations in said digital satellite communication system;
a demultiplexer connected to the receiving antenna for demultiplexing the received radio-frequency to produce a plurality of baseband signals;
demodulators connected respectively to the demultiplexer to provide demodulated baseband outputs;
a baseband signal processing circuit for switching the demodulated baseband outputs in synchronism with stable clock timings;
transmitters receptive of switched outputs of the baseband processing circuit to provide transmitting radio-frequency signals;
a multiplexer connected to the transmitters to produce a multiplex radio-frequency signal;
a transmitting antenna connected to the multiplexer to transmit the multiplex radio-frequency signal;
receiving timing detectors respectively connected to the baseband outputs of the demodulators for detecting the frame timings of the baseband outputs of the demodulators;
signal storage circuits provided between respective outputs of the demodulators and the baseband signal processing circuit for storing respectively the baseband output signals of the demodulators by respective desired amounts; and
control means operatively connected to the receiving timing detectors, the signal storage circuits and the baseband signal processing circuit for controlling the storage operations of the signal storage circuits so that each of the frame timings of the demodulated baseband signals and the switching timing of the baseband signal processing circuit bear a desired timing relationship.

4. A satellite repeater for a digital satellite communication system for use on-board of a satellite comprising:
a receiving antenna for receiving radio-frequency signals sent from a plurality of ground stations in said digital satellite communication system;
a demultiplexer connected to the receiving antenna for demultiplexing the received radio-frequency signals to produce a plurality of baseband signals;
demodulators connected respectively to the demultiplexer to produce demodulated baseband outputs;
a multiplexing circuit or multiplexing the demodulated baseband outputs to produce a multiplex baseband signal in synchronism with stable clock timings;
a transmitter respective of the multiplex baseband signal from the multiplexing circuit to produce a multiplex transmitting radio-frequency signal;
a transmitting antenna connected to the transmitter to transmit the multiplex transmitting radio-frequency signal;
receiving timing detectors respectively connected to receive the outputs of the demodulators for detecting the frame timings of the baseband outputs of the demodulators;
signal storage circuits provided between respective outputs of the demodulators and the multiplexing circuit for storing respectively the baseband outputs of the demodulators by respective desired amounts; and
control means operatively connected to the receiving timing detectors, the signal storage circuits and the multiplexing circuit for controlling the storage operations of the signal storage circuits so that each of the frame timings of the demodulated baseband outputs and the multiplexing timing of the multiplexing circuit bear a desired timing relationship.

5. In a satellite repeater for a system in which two digital satellite communication systems individually operated on independent clock timings are inter-connected by an inter-satellite link,
the improvement of the satellite repeater comprising:
receiving antennas for receiving radio-frequency signals sent from a plurality of ground stations in said digital satellite communication system;
receivers connected respectively to the receiving antennas;
a signal processing circuit for switching signals received by said receivers in synchronism with stable clock timings;
transmitters receptive of switched outputs of the signal processing circuit to produce transmitting radio-frequency signals;
transmitting antennas connected respectively to the transmitters to transmit the transmitting radio-frequency signals;
a receiving timing detector connected to receive the output of one of the receivers for detecting the frame timing of the output signal of said one of the receivers;

a signal storage circuit provided between said one of the receivers and the signal processing circuit for storing the output signal of said one of the receivers by a desired amount;

control means operatively connected to the receiving timing detector, the signal storage circuit and the signal processing circuit for controlling the storage operation of the signal storage circuit so that the frame timing of the received signal of said one of the receivers and the switching timing of the signal processing circuit bear a desired timing relationship, and one of said transmitters corresponding to said one of the receivers being connected to one of said transmitting antennas to provide said inter-satellite link.

* * * * *